United States Patent
Maleo et al.

(10) Patent No.: US 7,051,583 B2
(45) Date of Patent: May 30, 2006

(54) METHOD AND DEVICE FOR FITTING A TIRE AND METHOD OF ANALYZING THE SAID TIRE

(75) Inventors: Patrick Maleo, Pont-du-Château (FR); Jean-Paul Keller, Pont-du-Château (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 32 days.

(21) Appl. No.: 10/721,266

(22) Filed: Nov. 26, 2003

(65) Prior Publication Data

US 2004/0103993 A1    Jun. 3, 2004

Related U.S. Application Data

(63) Continuation of application No. PCT/EP02/05897, filed on May 29, 2002.

(30) Foreign Application Priority Data

Jun. 7, 2001    (FR) .................................. 01 07626

(51) Int. Cl.
    *G01M 17/02*    (2006.01)
(52) U.S. Cl. ..................... 73/146; 152/154.2
(58) Field of Classification Search .................. 73/146; 152/154.2, 158
    See application file for complete search history.

(56) References Cited

U.S. PATENT DOCUMENTS

| | | | |
|---|---|---|---|
| 3,724,137 A | | 4/1973 | Hofelt, Jr. et al. |
| 5,060,510 A | | 10/1991 | Rousseau |
| 5,365,781 A | * | 11/1994 | Rhyne ........................ 73/146 |
| 5,458,176 A | * | 10/1995 | Rhyne ........................ 152/556 |
| 5,616,859 A | | 4/1997 | Rhyne |
| 6,615,144 B1 | * | 9/2003 | Williams et al. .............. 702/41 |
| 2002/0088518 A1 | * | 7/2002 | Dufournier et al. ...... 152/154.2 |
| 2004/0159384 A1 | * | 8/2004 | Dufournier et al. ......... 152/158 |

* cited by examiner

*Primary Examiner*—Edward Lefkowitz
*Assistant Examiner*—Andre Allen
(74) *Attorney, Agent, or Firm*—Buchanan Ingersoll PC

(57) ABSTRACT

The invention concerns a method and device for fitting a tire, of the type with an incorporated air chamber, normally referred to as "tubeless", on a rim.

Figure 1:
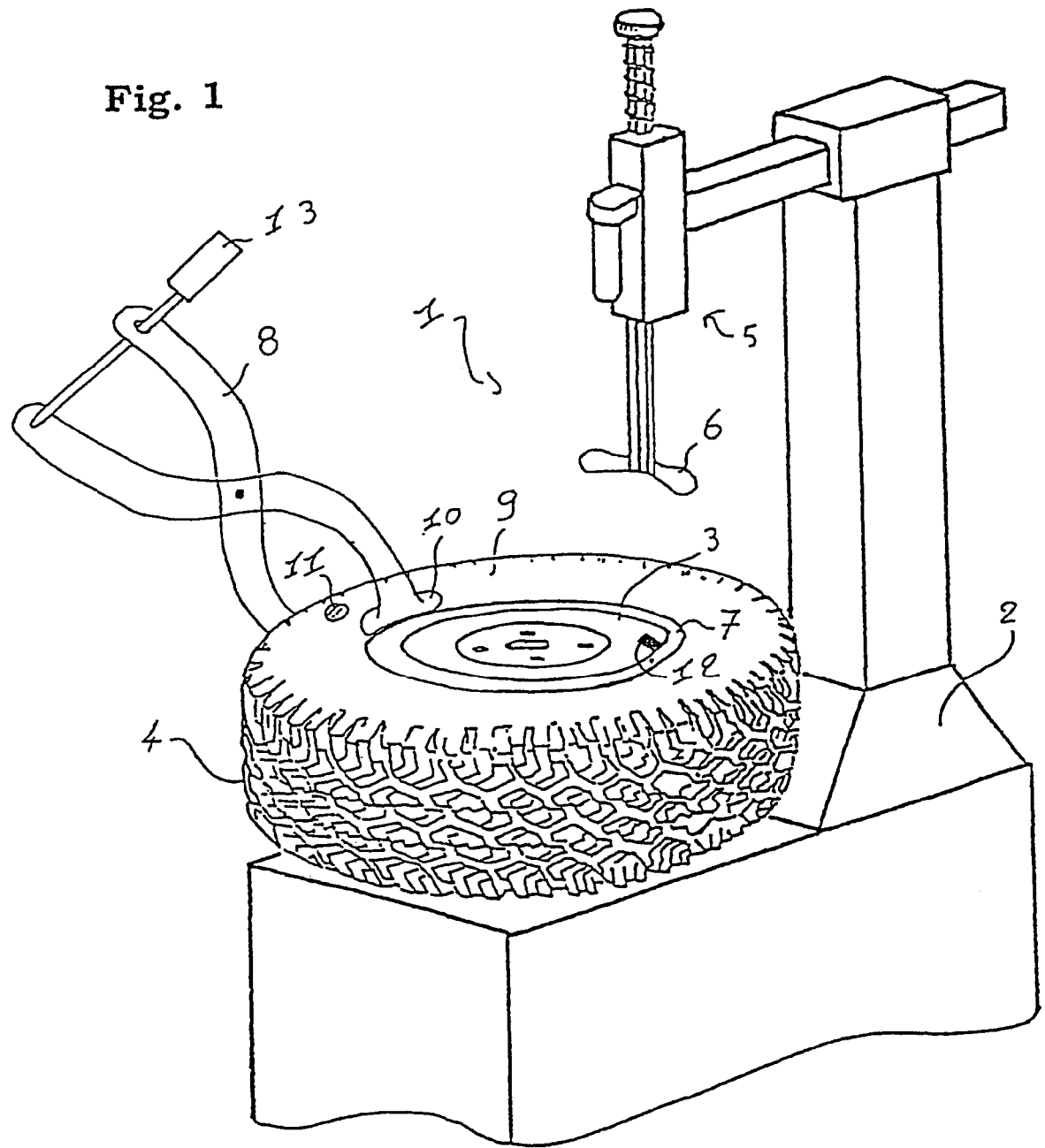

According to the invention, the said tire having a marking indicating an extreme value of a parameter having a circumferential variation, an area of at least one bead of the tire is held at least during a first inflation phase, the said area being azimuthed according to the said marking.

The fitting according to the invention makes it possible to control the variations in radial load on the periphery of the fitted assembly.

The invention also proposes a method of analyzing such a tire.

9 Claims, 3 Drawing Sheets

METHOD AND DEVICE FOR FITTING A TIRE AND METHOD OF ANALYZING THE SAID TIRE

This application is a continuation of international PCT application Ser. No. PCT/EP02/05897, filed May 29, 2002, which was published in English as WO 02/098683A1 on Dec. 12, 2002, and which is incorporated by reference.

The invention concerns a product and device for fitting a tire, of the type with an incorporated chamber, normally referred to as "tubeless", on a rim. The fitting according to the invention makes it possible in particular to control the variations in radial load on the periphery of the fitted assembly. The invention also proposes a method of analyzing such a tire prior to fitting.

Although not limited to such applications, the invention will be particularly described with reference to the fitting of tires on rims having humps. The humps are protrusions whose function is to prevent or at least delay the occurrence of any loosening of the tire in the event of a pressure drop.

A normal rim of the drop center type consists of various areas; first of all, a rim flange, or attachment area, whose main role is to hold the tire bead in the inflated state; next the bead seat, normally slightly conical, on which the bead rests and which provides the clamping thereof, as well as air tightness in the case of so-called "tubeless" incorporated-chamber tires; and finally a groove intended to allow the fitting of the tire because of its diameter less than that of the flange. In the case of a rim having humps, the latter are present between the bead seat and the groove which allows fitting.

The usual method of fitting a tire on such a rim, for example by means of a semi-automatic machine, consists of various steps as follows; the first is to pass part of the first bead over the first rim flange and this part is positioned in the groove. It is then possible to pass the remainder of the bead over the first flange because of a slight ovality of the bead wire and deformation of the flexible sidewall of the tire. The same applies for passing the second bead over the first rim flange or the other flange. The fitting then ends with a final step of inflation to a pressure such that it ensures that the beads are put in place on the seats in abutment on the two rim flanges. During this last step the beads pass over the humps, which form an obstacle to the passage of the said beads as far as their respective seats. The fitted assembly thus formed is then put at the required running pressure.

It is known that tires can exhibit circumferential non-uniformities; these are imperfections resulting for example from irregularities in thickness of the strips of rubber which make up the tire or for example protrusions in the areas of welding of semi-finished products which make up the tire or from variations in rigidity around the wheel, due in particular to welding and non-homogeneity of material. These non-uniformities, which may be of different types, result in various types of disturbance to the behavior of the fitted assemblies, which are detected and if necessary corrected in different ways. These non-uniformities can in particular result in variations in radial load, variations in axial force, variations in tangential force, etc.

Known methods reveal these non-uniformities and means are also known for correcting them when this proves necessary. Such a method, which is aimed at detecting and if necessary correcting the variations in radial load, is in particular described in the document U.S. Pat. No. 3,724,137; this document describes a technique consisting of fitting a tire to the rim of a wheel, inflating the fitted assembly thus made up to the running pressure and causing it to run against a load drum exerting a load on the fitted assembly so as to obtain a predetermined deformation. In this way the radial force measured by the fitted assembly on the load drum is measured and the variations in this force are measured by means of force transducers which are mounted on the axis of the load drum and oriented radially. According to the variations in radial load detected, corrective actions may possibly be undertaken, for example using abrasive wheels which remove material on the tread so as to make the fitted assembly more uniform and to bring the variations in radial load back within acceptable tolerances.

These detection methods show that very often tires have defects in uniformity, due essentially to the manufacturing method, which, though they can be minimized by manufacture of improved quality, can certainly not be completely non-existent. This is because it is quite clearly impossible to guarantee the non-existence of such defects. Tires can sometimes be sold when they exhibit values of variation in radial load which lie within defined tolerances, so that the use of the tires does not cause any unbearable inconvenience to the end user. It is clear however that such variations in radial load which may exist are a more or less substantial nuisance for the user, in particular in terms of comfort.

The task has therefore been adopted of designing a fitting technique which where applicable appreciably moderates the effects of the variation in radial load of the tire on the fitted assembly.

This aim is achieved according to the invention by a method of fitting a tire on a wheel rim, the said tire having a marking indicating an extreme value of a parameter having a circumferential variation, a method according to which an area of at least one bead of the tire is held at least during a first inflation phase, the said area being azimuthed according to the said marking placed on the tire.

According to a preferred embodiment of the invention, the marking indicates the position of the maximum of the harmonic H1 of the variation in radial load of the tire.

According to one advantageous variant of the invention, the bead on an area coinciding with the marking placed on the tire is held.

According to this fitting method, a predetermined area of the tire bead which corresponds to its maximum of the harmonic H1 of variation in radial load is held temporarily whilst the corresponding bead passes over the hump in order to be positioned on the bead seat in contact with the rim flange under the effect of the inflation. In this way the sector of the bead which passes over the hump last is determined.

The results thus obtained show that effectively the fitting method according to the invention can reduce the variations in radial load obtained on fitted assemblies whatever the type and dimension of the tires used.

It has been possible to show that, during the fitting of a tire on the rim of a wheel, an additional component appears in the constitution of the variations in radial load of the fitted assembly due to the fitting itself. It has also been shown that a fitting as recommended according to the invention improves the uniformity of the fitted assembly over the wheel circumference. It has in fact been possible to show that a non-axisymmetric seating of the bead on the wheel circumference may result from passing the humps during inflation. It has become clear that, although the passing of the humps with problems is located on a small sector corresponding to the last area of the bead passing over the hump during inflation, it causes a disturbance which is distributed in harmonic H1 on the wheel circumference. This variation in radial load due to the fitting of the tire on the wheel is therefore added vectorially to the harmonic H1 of the variation in radial load of the tire.

It has also been shown that the last area of the bead passing over the hump results in the minimum radial load component due to fitting.

The fitting method according to the invention thus corresponds to a combination in phase opposition of the harmonics H1 of the variation in radial load of the tire and the variation in radial load due to the fitting.

According to a preferred embodiment of the invention, areas of the two beads of the tire are held symmetrically with respect to the circumferential mid-plane. According to this embodiment of the invention, the passage over the humps is controlled on both sides of the tire during the inflation phase.

Advantageously and in particular to allow the finishing of the fitting without any risk of increasing the variation in radial load due to the fitting nor for example damaging the external surface of the tire sidewall (or sidewalls) on which the grip may be exerted, the intensity of the said grip of the bead reduces with inflation.

It is also known that the wheels on which the tires are fitted can also exhibit circumferential defects due to manufacturing techniques. These defects are almost non-existent on alloy wheels and much less pronounced on steel wheels than was the case before. It is often possible to ignore such defects, their degree of significance being secondary compared with the values in variation in radial load which may exist on a tire. However, in the context of the invention, the method proposing in particular to improve the uniformity of the fitted assembly, it may be opportune to take account of the average out-of-round of the wheel, which may cause a variation in harmonic H1 of the radial load due to the wheel. The resultant of these three parameters, related respectively to the tire, to the fitting and to the wheel, which is a vectorial sum, will result in a variation in radial load of the fitted assembly. One intention in design may be to attempt as far as possible a vectorial combination of the three parameters resulting in a circumferentially uniform fitted assembly, that is to say to attempt to obtain a zero vectorial sum. The absolute values or norms of the said vectors not being known precisely and moreover measured according to different methods, it seems tricky industrially to use such a technique; it is however possible, according to the above principle of the invention, to orient the three vectors in order to oppose two to the highest one, that is to say to put into phase opposition two parameters of variation in radial load with respect to the third. Orientation should be taken to mean, within the meaning of the invention, that an attempt is made to make the position of these vectors coincide to within an angle, the latter being defined by measuring tools used during the apposing of the markings, by the position of the last area passing over the humps during fitting and by the precision of the different tools used during fitting.

According to a first variant embodiment of the invention, the tire is fitted on a wheel where the maximum of the harmonic H1 of the average out-of-round is marked, the marking on the tire being diametrically opposed to the said marking on the wheel during fitting.

Such a fitting corresponds for example to a case where the variation in radial load of the tire is preponderant compared with the other parameters, which are the variation in radial load due to fitting and the average out-of-round of the wheel.

According to a second variant embodiment of the invention, the tire is fitted on a wheel where the maximum of the harmonic H1 of the average out-of-round is marked, the marking on the tire being positioned on a radius similar to that of the said marking of the wheel during fitting.

This second type of fitting corresponds to a case where the variation in radial load due to the fitting is preponderant with respect to the variation in radial load of the tire and the out-of-round of the wheel.

According to one or other of these variant embodiments, the invention can make it possible to obtain an improvement in the circumferential uniformity of the fitted assembly with regard to the variation in radial load.

A device is also proposed for implementing the method described above.

According to this invention, this device for fitting a tire on a rim, the said tire having a marking indicating an extreme value of a parameter exhibiting a circumferential variation, includes, in addition to the usual fitting and inflation means, a tool designed to exert a support force on an area of at least one sidewall of the tire at least during a first inflation phase, the said area being azimuthed according to the said marking.

According to a preferred embodiment of the invention, the marking indicates the position of the maximum of the harmonic H1 of the variation in radial load of the tire.

According to an advantageous variant of the invention the said area coincides with the said marking.

According to a first embodiment of the invention particularly adapted to the case of a semi-automatic machine, the tool is advantageously in the form of a clamp or pincer so as to be able to act on the two sidewalls of the tire simultaneously in order to control the passage over the humps on each side. The clamp is preferably used on a second station in order to simplify its placing on the tire, the said second station being an inflation station. According to other embodiments, the clamp can be provided on the fitting station, the fitted assembly being brought into the appropriate position before inflation commences. The placing of the clamp in contact with the tire may be carried out manually or semi-automatically. The force exerted on the clamp in order to be reproduced on the tire will advantageously be obtained by means of a system of the ram type so as to obtain a force of sufficient and reproducible intensity; such means also make it possible to progressively reduce the intensity of the force when the inflation arrives at the required pressure. The areas of contact between the clamp and the tire preferably have a certain surface area in order not to damage the tire; these zones are advantageously not too extensive so as to locate the final passage over the humps in a zone which is as small as possible.

According to a second embodiment of the invention corresponding more specifically to an automated fitting line, the tool is in the form of at least one mechanical pressure means. An automated fitting line consists of effecting a rapid inflation, for reasons of throughput, of the fitted assemblies without using the valve; to do this, a bell is applied sealingly to one sidewall of the tire, this bearing on the bottom part of the said sidewall in order to keep the bead spaced apart from the rim flange and to offer passage for the air which is introduced under pressure. The mechanical pressure means according to the invention can be an additional element or may be combined with the means of holding the bead away during the inflation. It may in particular be a case of a bell whose peripheral profile is modified, for example by the presence of a local protrusion, so that the said bell exerts a higher pressure on a local predetermined area of the bottom part of the sidewall.

As in the previous case, the mechanical pressure means are such that it advantageously has areas of contact between the tool and the tire having a certain surface area in order not to damage the tire; these areas are advantageously not too extensive so as to locate the final passage over the humps within the smallest possible area.

According to a preferred implementation of this second embodiment, a second mechanical pressure means is provided on the other sidewall so as to control the final passage over the humps on each side, facing each other.

There is also proposed a method of analyzing a tire in order to predict its sensitivity, or its suitability, for mounting on a rim, the method consisting of determining a variation in radial load due to the fitting of the tire on a rim having humps.

The analysis method according to the invention gives a trend for a given family of tires with a value comparable to those obtained for other families of tire already measured.

It may in fact be opportune to predict what will be the variation in radial load due to the fitting of a tire in order to know either whether the fitting technique according to the invention requires to be used or possibly in order to specify how the fitting should be effected, for example taking account of the average out-of-round of the wheel. This is because such a predictive method may lead to ignoring the variation in radial load due to fitting, or, if this is large, possibly making provision for combining it with that of the wheel or on the other hand compensating for it by combining that of the wheel associated with that of the tire.

According to a preferred embodiment of the invention, this method of analyzing a tire in the family in question consists of determining the variation in radial load of a fitted assembly, the rim having humps, determining the variation in radial load of this same tire and effecting the vectorial difference between the two values obtained.

The measurement of the variation in radial load of the tire in the family in question is obtained by measuring on a fitted assembly using a rim without humps and high-performance lubricating means ensuring good positioning.

In both cases the measurement of the variation in radial load is made according to the technique mentioned above and preferably on the same measuring device.

Figure 2:
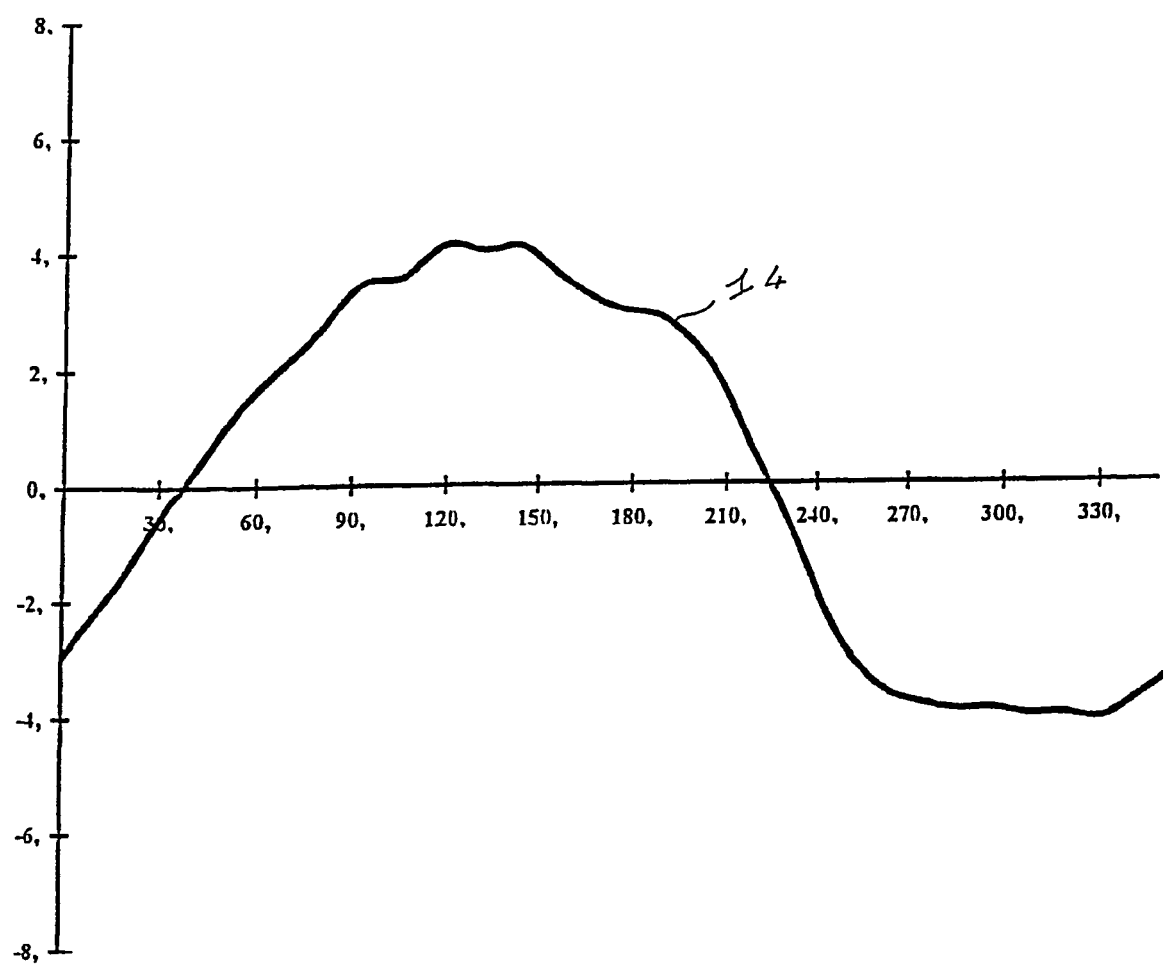
Figure 3:
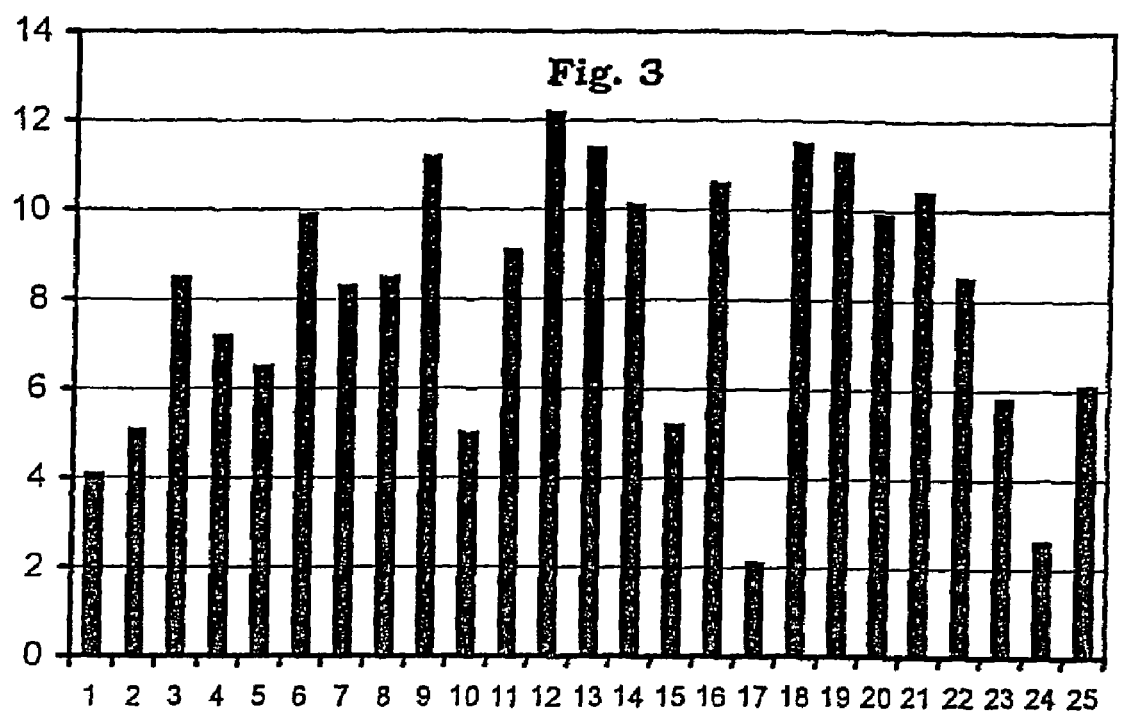
Figure 4:
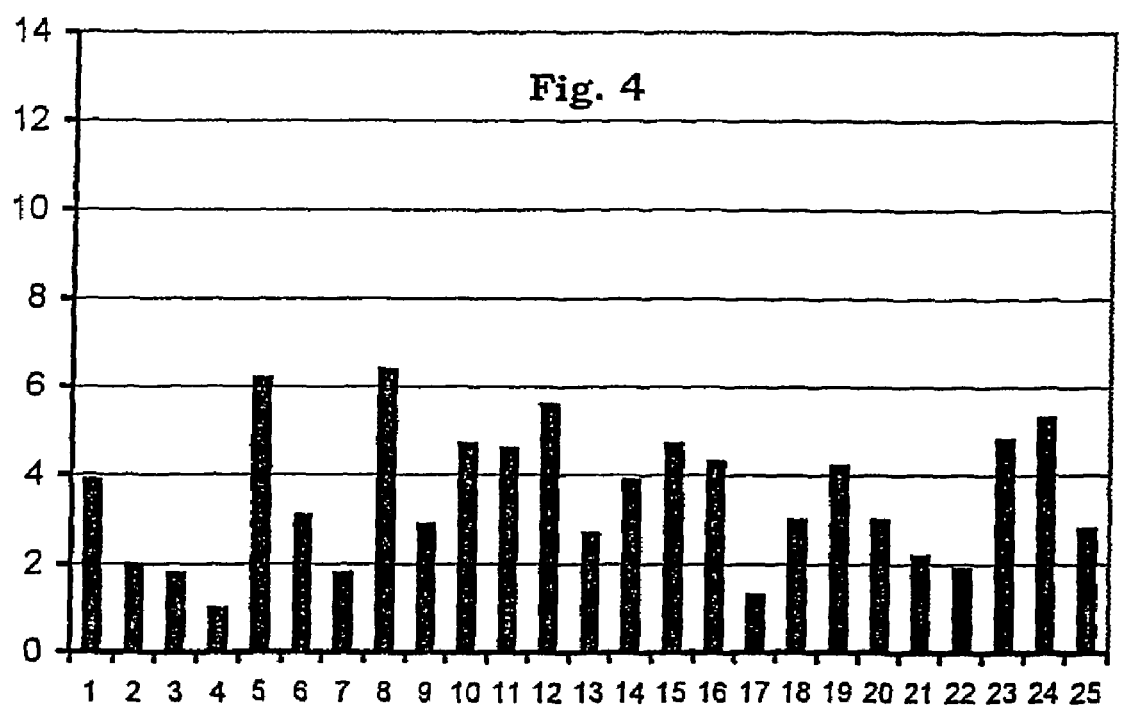

Other details and advantageous characteristics of the invention will emerge below in the description of one example embodiment of the invention and tests carried out, with reference to FIGS. 1 to 4, which depict:

FIG. 1, a diagram of a device for implementing the invention on a semi-automatic tire fitting machine;

FIG. 2, a curve illustrating the variation in radial load related to fitting,

FIG. 3, a diagram illustrating the results obtained according to a normal fitting, referred to as random, FIG. 4, a diagram illustrating the results obtained according to the invention.

FIG. 1 is not shown to scale in order to simplify understanding thereof.

FIG. 1 shows schematically a semi-automatic fitting machine 1 which comprises a frame 2 on which a rotary plate, not shown in FIG. 1, turns the assembly consisting of wheel 3 and tire 4 about a vertical axis. The machine also comprises a tool 5 coupled to a roller 6 which makes it possible to make the bead on the tire 4 pass over the rim flange 7. In FIG. 1, the tool 5 is shown in a raised position, the passage of the second bead of the tire 4 over the rim flange 7 already being effected.

This same FIG. 1 shows a device according to the invention which can be turned in a clamp or nipper 8. This clamp 8 is positioned in contact with the tire 4 in abutment on each of the sidewalls 9 as close as possible to the wheel 3 by means of end pieces or jaws 10 which allow a spread abutment in order not to damage the surface of the tire 4. The clamp 8 is also associated with a tightening system, such as a ram 13, which guarantees the intensity of the tightening and ensures its reproducibility. The areas of abutment of the clamp 8 on the sidewalls 9 coincide with a marking or labeling 11 produced on the tire 4. This marking 11, previously carried out, indicates the maximum of the harmonic H1 of the radial load of the tire 4.

This maximum of the radial load of the tire 4 is determined in advance by measurements such as those described in particular in the U.S. Pat. No. 3,724,137.

FIG. 1 also shows the valve 12 connected to a hose, not shown, through which the compressed air arrives which will inflate the tire and thus end its fitting.

According to the principle of the invention, prior to this inflation phase, the clamp 8 is positioned and actuated in order to grip the beads on each of the side walls of the tire 4 level with the labeling 11. The positioning of the clamp 8 and its tightening may be manual or automatic, and the automatic mechanisms can be produced by any means known to persons skilled in the art, the tire 4 being positioned so that the labeling 11 faces the clamp 8. The action of the clamp 8 will advantageously decrease progressively and allow the passage of the humps through the areas of the beads until held there. These areas being according to the invention the last to pass over the humps as the wheel turns.

FIG. 2 is a curve depicting the variation in radial load related to the fitting of a tire on a wheel having a rim with humps. This curve is obtained by the difference of two measurements made over a wheel circumference. These measurements are respectively the measurement of the variation in radial load of a tire and the variation in radial load of an assembly mounted over a wheel circumference. The measurements are made according to a technique such as the one described above and in particular described in the patent U.S. Pat. No. 3,724,137.

The measurements are made on the same installation with conditions which are adapted to the dimensions of the tire.

The measurement of the variation in radial load of the tire is obtained by measuring on a fitted assembly using a rim without humps with the use of a grease with a high lubricating power, which allows good fitting with regard to the positioning of the tire beads on their seats in abutment on the rim flanges.

The measurement of the variation in radial load of the fitted assembly is made on a rim having humps such that it exhibits detrimental conditions in terms of passing over in the context of the tolerances under the ETRTO standard.

The curve 14 obtained according to the method explained above and depicted in FIG. 2 is therefore the variation in radial load due to fitting, expressed in daN, on a wheel circumference. It shows that the variation in radial load is indeed distributed essentially in harmonic H1. These results will make it possible, as explained above, to know whether it is opportune to use the fitting method according to the invention.

These results can also be a source of information for persons responsible for developing new tire structures. This is because it is thus in particular possible to optimize the bottom areas of the tires in order to include the fitting of the said tires.

FIGS. 3 and 4 depict respectively a diagram illustrating the results obtained with a normal so-called random fitting and a diagram illustrating the results obtained according to the invention, concerning the fitting of a 215/55 R 16 tire. The results presented correspond to the values of the maximum radial load obtained for each diagram on 25 fitted assemblies. These figures show that the fitting proposed by the invention improves the quality of fitting and more specifically the variation in radial load over a wheel circumference. This is because the value of the maximum radial load obtained by the average of the 25 measurements is equal to 3.5 daN in the case of the invention whilst the average value obtained on the 25 random fittings is 8.1 daN.

It should be added that the fitting according to the invention can be carried out without risk whatever the tire which is to be fitted. This is because this fitting can if applicable provide only a negligible effect in the case of a tire which a priori does not present potential risks of variation in radial load during its fitting but the fitting technique according to the invention can under no circumstances be detrimental to the quality of the fitted assembly, particularly with regard to its variation in radial load.

The invention claimed is:

1. A method of fitting a tire on a rim, the tire possessing beads and a marking indicating the position of a maximum of the harmonic H1 of a variation in radial load of the tire, the method comprising inflating the tire while an area of at least one of the beads, coinciding with the position of the marking, is held from passing over a respective rim hump at least during an initial phase of the inflation, and while the rest of said at least one bead is allowed to pass over the hump.

2. The method according to claim 1 wherein the at least one bead comprises both beads.

3. The method according to claim 1 wherein the holding of the at least one bead area is performed by a force which decreases in intensity during the inflation.

4. The method according to claim 1 wherein the rim comprises part of a wheel which has a marking coinciding with the maximum of the harmonic H1 of the average out-of-round of the wheel, the respective markings of the wheel and the rim being substantially diametrically opposed during the fitting.

5. The method according to claim 1 wherein the rim comprises part of a wheel which has a marking coinciding with the maximum of the harmonic H1 of the wheel, the respective markings of the wheel and the rim lying substantially on a common radius.

6. Apparatus for fitting a tire on a rim, the tire possessing beads and a marking indicating the position of a maximum of the harmonic H1 of a variation in radial load of the tire, the apparatus including a support on which the tire is supported during inflation, and a tool configured for holding only a portion of at least one bead, coinciding with the position of the marking, from passing over a respective rim hump while allowing the rest of said at least one bead to pass over the hump during the inflation.

7. The apparatus according to claim 6 wherein the tool comprises a clamp or zipper.

8. The apparatus according to claim 6 wherein the tool comprises at least one mechanical pressure means.

9. The apparatus according to claim 6 wherein the tool is configured for holding respective areas of both beads.

* * * * *